Feb. 5, 1957   J. J. JAKOSKY   2,780,301
APPARATUS FOR SEISMICALLY EXPLORING
GEOLOGICAL FORMATIONS UNDER WATER
Filed June 19, 1952   2 Sheets-Sheet 1
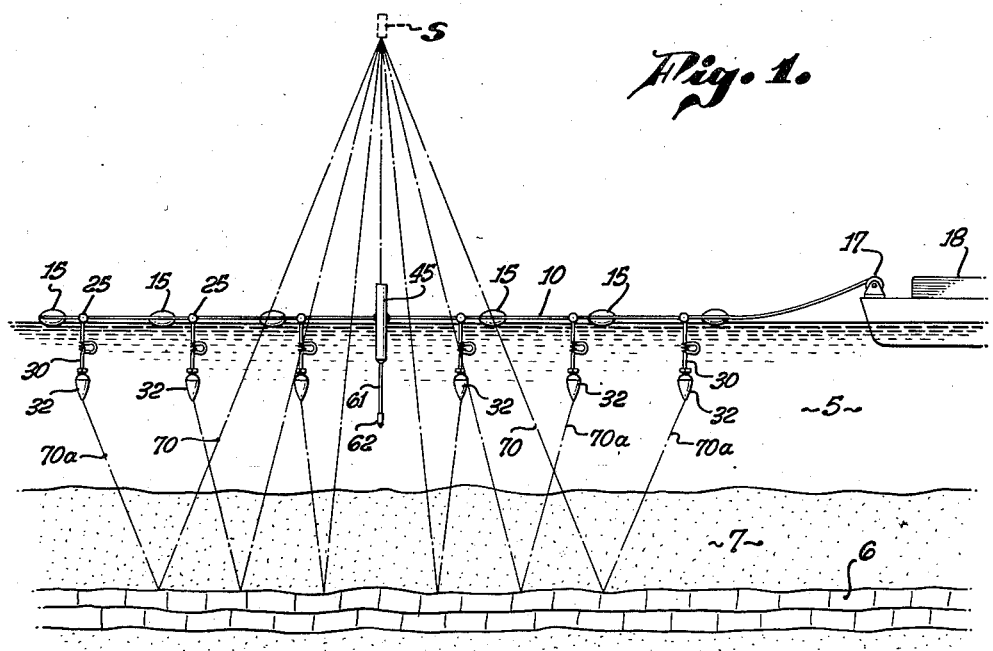
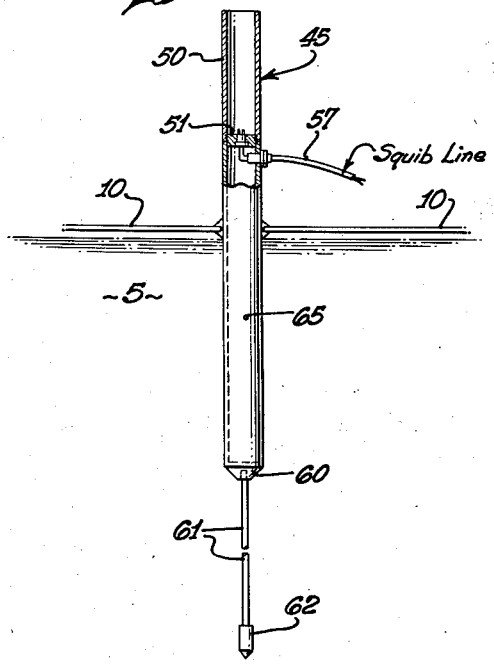
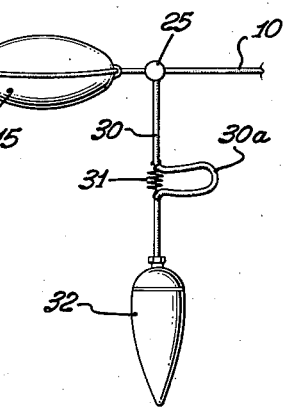
JOHN J. JAKOSKY,
INVENTOR.
BY *Mason & Graham*
ATTORNEYS.

Feb. 5, 1957 J. J. JAKOSKY 2,780,301
APPARATUS FOR SEISMICALLY EXPLORING
GEOLOGICAL FORMATIONS UNDER WATER
Filed June 19, 1952 2 Sheets-Sheet 2
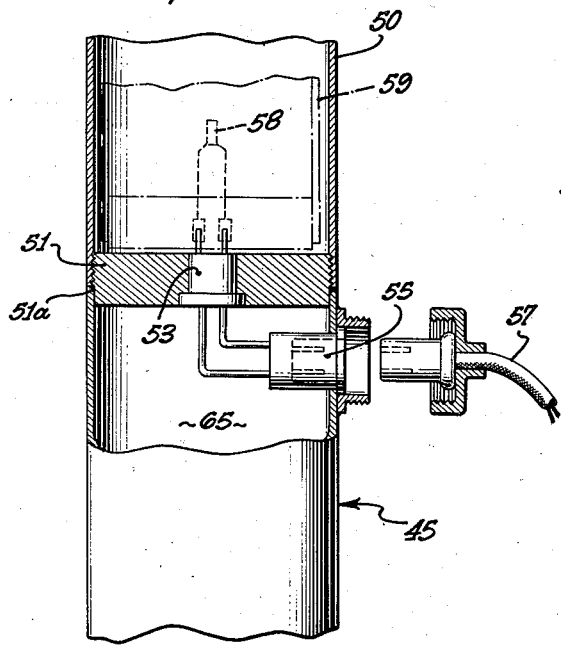
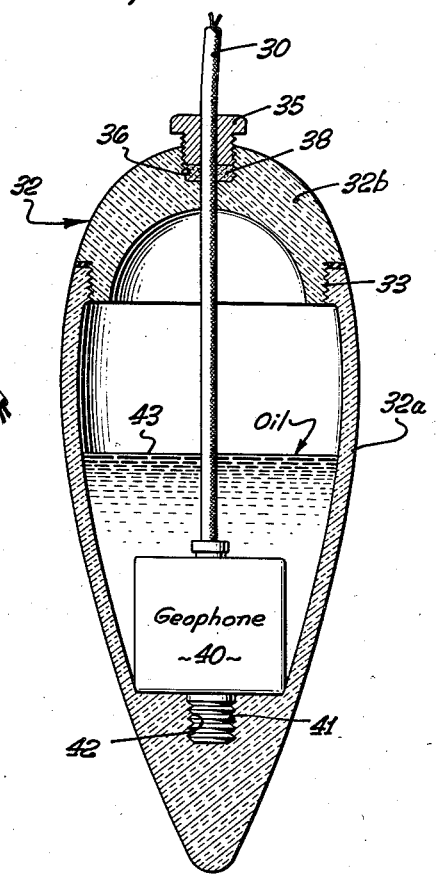
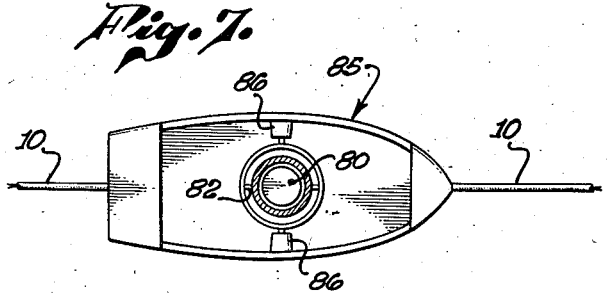
John J. Jakosky,
INVENTOR.
BY
ATTORNEYS.

United States Patent Office 2,780,301
Patented Feb. 5, 1957

2,780,301

APPARATUS FOR SEISMICALLY EXPLORING GEOLOGICAL FORMATIONS UNDER WATER

John J. Jakosky, Los Angeles, Calif., assignor, by direct and mesne assignments, of forty percent to International Geophysics, Inc., Los Angeles, Calif., a corporation of California, and sixty percent to Signal Oil and Gas Company, a corporation of Delaware Application June 19, 1952, Serial No. 294,361

4 Claims. (Cl. 181—.5)

My invention has to do with improvements in the art of seismically exploring underwater geological formations by creating and reflecting from the subterranean strata seismic waves and recording the reflected waves by suitable recording apparatus.

As is well known, many oil-bearing geological formations underlie bodies of water, such as oceans and lakes, and, while seismic exploration, to determine the characteristics of subterranean strata, is a well-developed art, to carry on such work in underwater formations has presented many serious difficulties.

It has been proposed to carry on such work by using boats to tow groups of seismic wave detectors or geophones and explosive charges to the location to be explored, then lowering the detectors and explosive charge to the ocean bottom, electrically connecting them to the recording instruments carried on the boat or boats and, after the detectors and explosives become firmly settled on the bottom, the charges are exploded and the seismic waves reflected from the subterranean strata are recorded by recording apparatus mounted in the boats. Then the detectors are pulled in and towed to another spot where the operation is repeated. Some refinements of this procedure have been proposed, such as moving the boats continuously and allowing the detectors and explosives to settle to the bottom by paying out the suspending cables while the boat continues to move. However, all those procedures have serious shortcomings. Not only do they require considerable, expensive equipment and considerable personnel, but it has been difficult to obtain uniform or definite positioning of the detectors relative to each other and relative to the explosive and, unless the seismologist is able to know quite definitely the relative positioning of those elements, the finally prepared seismogram does not have the proper resolving qualities. Also such previously proposed procedures are objectionable in that they result in destroying or harming marine life in the water overlying the land being explored.

It is an object of my invention to overcome those disadvantages of previously proposed procedures in charting underwater geological formations.

It is a further object to provide apparatus by which not only the detectors, but also the mortar for handling the explosive, may be intermittently or continuously towed from a moving boat.

Another object is to provide apparatus by which underwater geological formations may be seismically explored without the necessity of positioning the seismic wave creating means on the bottom of the body of water.

A further aim of my invention is to provide novel apparatus for carrying on underwater geological exploration by exploding in the air above the water a projectile to create the incident waves.

A further object is to provide improved apparatus and arrangement for maintaining the detectors and the explosive propelling element afloat and in definite predetermined spaced relationship at all times.

A further object is to provide apparatus for minimizing shot noise and wave motion when employing aerial shooting over water.

A still further object is to provide apparatus and procedure by which, because the explosion takes place in the air above the water, no harm to or destruction of marine life results.

Without intending thereby to limit the broader aspects of my invention, except as may appear from the appended claims, I shall now explain presently preferred apparatus and procedure for carrying out the invention, from which further equivalent modifications and procedures will be made apparent to those skilled in the art. For this purpose I shall refer to the accompanying drawings wherein:

Fig. 1 is a section of a body of water with an underlying geological formation, and showing the positioning of the mortar and detectors during a typical operation;

Fig. 2 is an enlarged side elevation showing a float and detector casing suspension;

Fig. 3 is an enlarged, sectional view of the novel mortar used in carrying out my invention;

Fig. 4 is a further enlarged, fragmentary, sectional detail of the mortar;

Fig. 5 is an enlarged sectional view of a detector casing;

Fig. 6 is an enlarged cross-section of the cable element; and

Fig. 7 is a plan view showing a modified mortar carrying element.

Referring now to the drawings, 5 denotes a body of water below which there is an earth formation to be explored, the formation comprising, as here shown, a reflecting stratum 6 and an overlying, relatively unconsolidated layer 7.

A cable 10 extends through and is secured to a plurality of floats 15, the cable being preferably wound at one end about a winch 17 carried, for instance, by a boat 18.

The cable 10 preferably has a flexible steel core 20 to provide adequate strength, carries a suitable number of conductors 21 for the purposes to be described, and has a rubber sheathing 22.

Recording equipment, such as conventional amplifier-filters, oscillograph and timer, not shown, are carried by the boat 18 and are conductively connected into the appropriate conductors 21. Take-off elements 25 are provided, one adjacent each float 15, and are conductively connected into the appropriate conductors 21 in the cable, and from each take-off member a detector lead 30 is suspended, each lead carrying on its bottom end a hollow detector-carrying casing 32. Each of the leads 30 is provided with a slacked portion 30a, the slack being maintained, for instance, by a yieldable member, such as a coil spring 31, although a strip of elastic material, such as rubber, may be substituted for the spring if desired. The purpose of the slacked portion of each lead is to prevent undue jarring or vibration of the detector casings 32 and their carried geophones, by shot noise, wind and wave motion, or other extraneous causes.

Each of the detector-carrying casings 32 is preferably streamlined and, in its preferred form, comprises a lower section 32a threaded at 33 onto an upper section 32b, in watertight engagement therewith. The lead 30 extends through a plug 35 threaded into a socket 36 in the top of section 32b, and to prevent entry of water into the casing a stuffing box 38 is provided. A conventional detector instrument, such as a geophone 40, is secured in the casing as by having a depending stud 41 threaded into a socket 42 in the lower casing section 32a. It is my preference to partially fill the casing interior with oil 43, the buoyancy being adjusted so that the casing will sink to a position maintaining the lead 30 substantially taut, except for the said slack, and perpendicular to the cable when the cable is not being towed or moved over the water, or substantially perpendicular when being towed at a speed only sufficient to allow steerageway for the towing boat.

It will be observed that the floats and the casings 32 with their carried geophones are arranged in groups of equal numbers. While I have specifically illustrated only six geophones, arranged in two aligned groups of three each, in practice each group would usually contain a larger number of floats and geophones, for instance, twelve. The geophone take-offs 25 of each group are equidistantly spaced from each other and each of the groups is spaced from an intervening mortar 45 a given distance, the mortar being also towed from and conductively connected into the cable 10.

As best shown in Figs. 3 and 4, the mortar 45 comprises a tube 50 having, spaced inwardly from its upper end, a partition wall 51 carrying an electrical plug 53. A waterproof plug 55 is mounted in an opening in the side wall of the tube beneath the partition so that electrical leads 57 from the appropriate conductors 21 in the cable may be connected to the squib 58 of a projectile 59 mounted in the mortar. The bottom end of the tube is sealed by a closure plug 60 from which depends a rod 61 carrying a weight 62 on its bottom end. To facilitate connecting the squib 58 of the projectile to the plug 53, the upper portion of the tube is made as a separate section and threadedly connected to the partition 51, while the lower end portion of the partition may be swaged in the adjacent lower tube section at 51a. This construction provides an air chamber 65 to maintain the mortar device afloat, the weight 62 maintaining it in upright position.

In operation the boat is moved to a suitable point on the water which will position the geophones and mortar in the proper position over the area to be explored. Inasmuch as my means of relatively positioning the seismographs and mortar is such as always to maintain them in any given predetermined spacing and relationship, the explosion to create the seismic waves and the recording of the reflected waves can be carried on while the boat is stationary or when moving at a very slow speed, say, one knot. This speed should be sufficient only to provide steerage-way for the towing boat, and will be dependent somewhat upon the wind velocity and the sea. If it is desired to have the detectors and mortar stationary at the instant of the explosion, this can be readily accomplished by paying out the cable 10 for a short period of time, say ten to twenty seconds, while the explosion takes place and the seismic recording is completed. In any event, when it is desired to create the desired shock wave, the operator in the boat closes the circuit through the appropriate conductors 21 to fire the squib 58, which propels the projectile upwardly to the shot point S, when the projectile may be exploded by a conventional time-delay cap or by the firing control system described in my copending application, Serial No. 301,941, filed July 31, 1952, now patent 2,759,397. Upon explosion of the projectile, a shock wave is created which creates incident seismic waves 70, which are reflected from the stratum 6 and reach the geophones as reflected waves 70a, being recorded by conventional recording apparatus in the boat. Each such recording apparatus may include a galvanometer type oscillograph arranged so that a light beam reflected on a series of galvanometer mirrors records separate traces showing the ground motion at the various geophones on a uniformly moving strip of photosensitive paper.

The slacked lead means which I utilize to suspend the geophones from the cable prevents them from being unduly disturbed by shot noise or reverberation, wind and wave motion at the surface of the water. The spring suspension is so adjusted that the frequency of the vertical vibration of the support is well below the seismic frequencies, i. e., below 15 cycles per second.

Air shooting creates "noise" which reverbrates for a number of seconds after the explosion; by submerging the detectors about 10 feet, the "noise" and the wave motion of the water are greatly minimized.

In Fig. 7 I show a means of utilizing a conventional mortar in my method and apparatus, instead of the special mortar heretofore described. Here a conventional mortar 80 is carried, as by gimbals 82, which in turn are mounted in a boat 85, or other suitable float member, by brackets 86. Thus, the mortar is always maintained in vertical position despite the fact that the boat or float may be tilted by ocean waves or the like.

While I have described the detector housing casings 32 as being submerged in the water, I wish it understood that I may mount the detecting apparatus in casings which are maintained afloat on the surface of the water.

I claim:

1. Apparatus for exploring under water geological strata comprising a length of cable, a bouyant projectile-propelling mortar secured to said cable intermediate the ends of the latter, float members attached to said cable at longitudinally spaced points therealong, a spread of seismic wave detectors connected to and suspended from said cable at equidistantly spaced points therealong at each side of said mortar, and means for towing said cable along the surface of a body of water.

2. Apparatus for exploring underwater geological strata comprising a length of cable, float members attached to said cable at longitudinally spaced points therealong, a buoyant projectile-propelling mortar secured to said cable intermediate the ends of the latter, a spread of seismic wave detectors connected to and suspended from said cable at equidistantly spaced points therealong at each side of said mortar, and means for maintaining said cable substantially taut throughout the length of said spread of detectors whereby to maintain said equidistant spacing of said detectors as well as to maintain a predetermined spacing of said detectors from said mortar.

3. Apparatus for exploring underwater geological strata comprising a length of cable, a buoyant projectile-propelling mortar secured to said cable intermediate the ends of the latter, float members attached to said cable at equidistantly spaced points therealong at each side of said mortar, a spread of detectors equidistantly spaced apart longitudinally of said cable at each side of said mortar, said respective detectors being secured to and depending from said cable adjacent said respective float members, and towing means connected to one end of said cable to move the same along the surface of a body of water and to maintain said cable substantially taut throughout the length of said spread of detectors whereby to maintain said equidistant spacing of said detectors and to maintain a predetermined spacing of said detectors from said mortar.

4. The apparatus of claim 2 wherein said seismic wave detectors are resiliently suspended from said cable.

References Cited in the file of this patent

UNITED STATES PATENTS

| 2,445,640 | Schermuly et al. | July 20, 1948 |
| 2,449,540 | Albin | Sept. 21, 1948 |
| 2,465,696 | Paslay | Mar. 29, 1949 |
| 2,614,165 | Doolittle | Oct. 14, 1952 |
| 2,615,523 | Poulter | Oct. 28, 1952 |
| 2,622,691 | Ording | Dec. 23, 1952 |
| 2,632,150 | Silverman et al. | Mar. 17, 1953 |
| 2,632,520 | Hintz | Mar. 24, 1953 |
| 2,638,176 | Doolittle | May 12, 1953 |

FOREIGN PATENTS

| 11,521 | Great Britain | 1915 |